Feb. 6, 1940.　　　　O. F. LEWIS　　　　2,189,670
COAL CUTTING MACHINE
Filed June 22, 1938　　　5 Sheets-Sheet 1

Feb. 6, 1940.   O. F. LEWIS   2,189,670
COAL CUTTING MACHINE
Filed June 22, 1938   5 Sheets-Sheet 4

OSWALD FLOYD LEWIS
INVENTOR

Myron B. Stevens
ATTORNEY

OSWALD FLOYD LEWIS
INVENTOR

Myron B. Stevens
ATTORNEY

Patented Feb. 6, 1940

2,189,670

UNITED STATES PATENT OFFICE 2,189,670

COAL CUTTING MACHINE

Oswald Floyd Lewis, near Sheffield, England, assignor of one-half to Newton, Chambers & Company Limited, near Sheffield, England, a corporation of Great Britain Application June 22, 1938, Serial No. 215,261
In Great Britain June 24, 1937

7 Claims. (Cl. 262—30)

This invention relates to coal cutting and like machines and more particularly to a combination cutting-loading machine.

The main object of the invention is to simplify the cutting and removal of the coal and eliminate the necessity for shot firing, and a further object is to avoid the trouble experienced when using the standard endless chain coal cutters owing to the cuttings being taken into the cut by the return run of the chain and clogging the chain, which may then require a greatly increased amount of power for its operation.

Further objects are to increase the accessibility of the chain for changing and adjusting the picks, to make the machine adaptable for varying thicknesses of coal seams and to increase the mobility of the machine.

The invention consists primarily in a machine having means for cutting coal at the top, side and bottom so as to leave a body of coal projecting backwardly from the direction in which the machine proceeds and unsupported except where it joins the uncut portion of the coal seam.

The coal is most conveniently cut at the top, side and bottom simultaneously by means of an endless cutting chain running in a vertical plane and given a bodily forwardly movement (i. e., a movement of translation in a horizontal direction at right angles to the vertical plane in which the chain runs), the chain having cutting picks projecting from one side of it in the direction in which it is drawn bodily forward. The chain runs along the floor, then vertically upwards to cut a new coal face and then along the roof and round a driving sprocket in the open space where the previous cut was made.

If desired, the horizontal undercut at floor level may be made by an ordinary type of cutter chain running on a horizontal jib and the clearance necessary to allow of protection of the return run of this jib chain would be made by a chain of the kind above described. The return run of the horizontal jib chain can thus be protected by a cover or guard to prevent coal from falling on it.

The cutter chain running in a vertical plane is guided by a suitable frame or vertical jib and another feature of the invention consists in the provision of adjustments which make the machine adaptable for cutting various thicknesses of seams, even in cases where the seam thickness varies or the seam makes a downward bend during the progress of the cutting machine. For this purpose the height of the jib frame can be increased or decreased by making a vertical part of the jib frame removable and replaceable by a section of different length in order to vary the size of the jib frame while the portion of the frame adjacent the driving head consists of a telescopic structure so that this part of the frame can be altered to correspond with the different length sections inserted in the opposite side of the jib frame. In order to allow for resulting variations in the effective or cutting run of the chain, the latter is guided round the chain driving sprocket by an idler sprocket which is adjustable in position so that it can be moved to take up any slack in the chain. To allow for large alterations in the height of the jib the length of the cutter chain can be varied by removing or inserting extra links and pick boxes and the pins by which the links and pick boxes are pivoted together are made easily removable to facilitate adjustment of the total length of the chain. By suitable alterations in the length of the chain and in the position of the adjustable sprocket the arc of contact between the chain and its driving sprocket can be maintained substantially constant despite changes in the size of the jib frame.

The telescopic structure is provided with hinge pins about which the rest of the frame hinges so that it can be swung into and out of an operative position which it occupies when the coal is being cut. The hinged part of the frame may be secured in its operative position by removable locking pins.

The machine can be made either single ended or double ended to cut in both directions of the face.

In alternative constructions of machine the chain driving sprocket is itself made adjustable in position to allow for small alterations to the total length of the cutter chain.

Another feature of the present invention consists in a construction of cutter chain suitable for the above described machine. In this chain the pick blocks or heads, in which the cutting picks are secured, project from the side faces of the pick boxes which are preferably constructed in two parts welded together at a central body portion. The pick boxes are joined into an endless chain by interposed links to which the boxes are pivoted by pivot pins and the links of the chain are made to fit at their ends between projecting members of the pick boxes, the ends of the links and the projecting members having sockets through which the pivot pins are passed. Each link is provided with a central hole or socket shaped to receive a tooth of the chain driving sprocket and of any idler sprocket.

The chain is adapted to be retained and guided during its travel round the jib by the provision of shoulders formed by making the end bosses of the links of smaller radius than the projecting members between which they fit.

One end of each pivot pin is made to fit flush and has a projecting shoulder and the other end has an annular ring groove for securing the pin in position.

Examples of constructions of machine according to the invention and details of the cutter chain are illustrated in the accompanying drawings in which.

Figure 3:
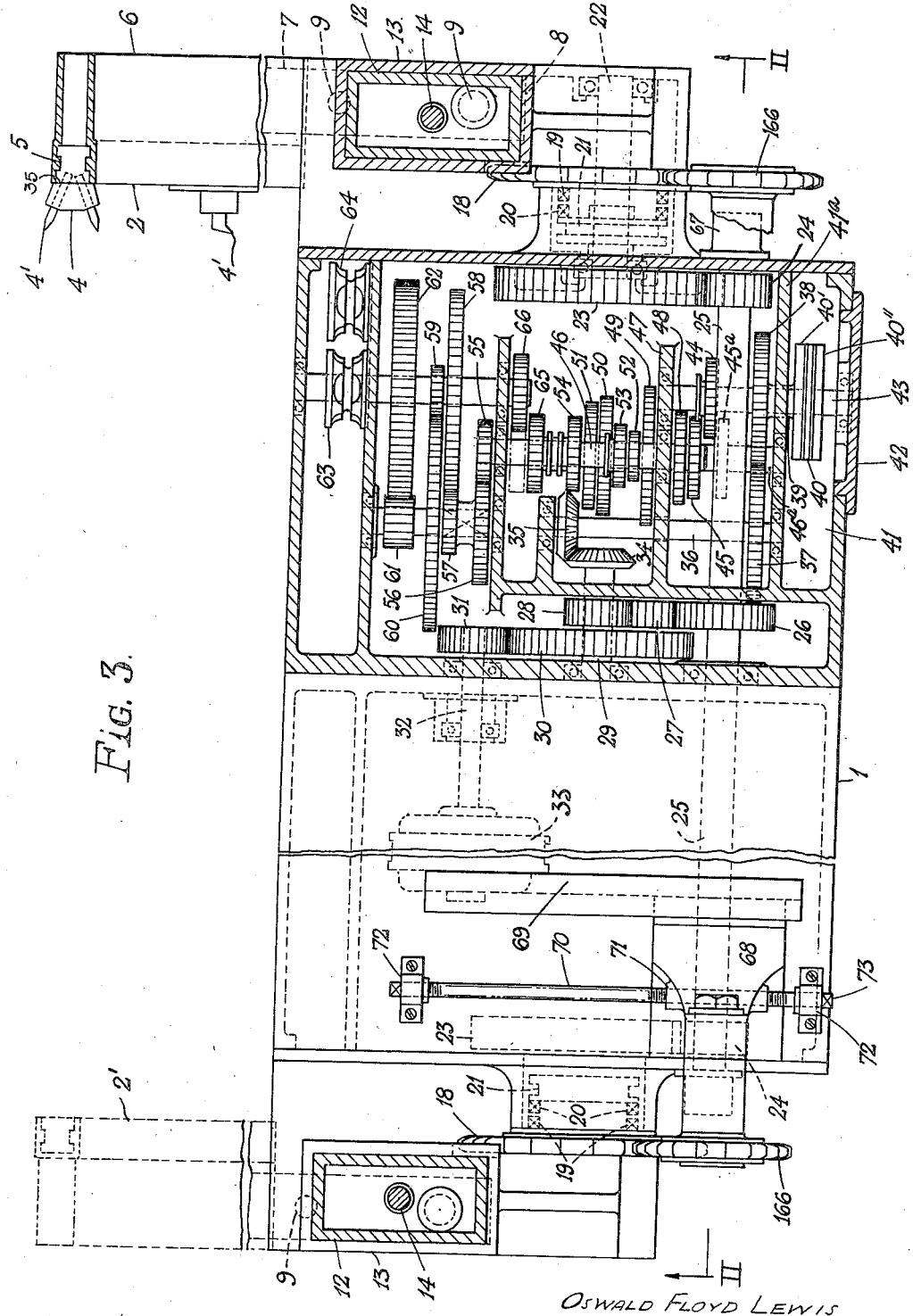
Fig. 3 is a plan view of the machine partly in horizontal section, partly in section on line III—III of Fig. 2.
Figure 6:
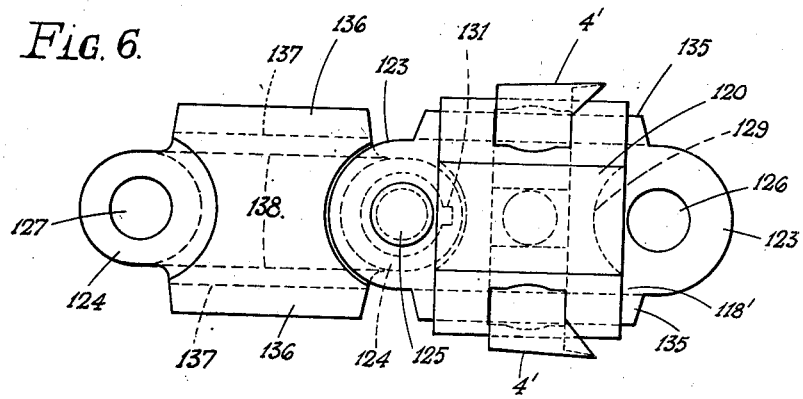
Fig. 6 is an elevation of a portion of the cutter chain to show the details of its construction.
Figure 7:
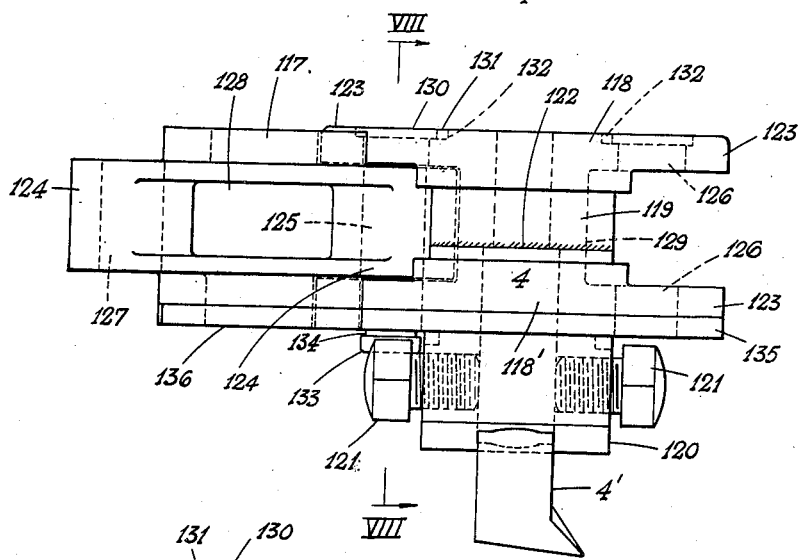
Fig. 7 is a plan view of Fig. 6.
Figure 8:
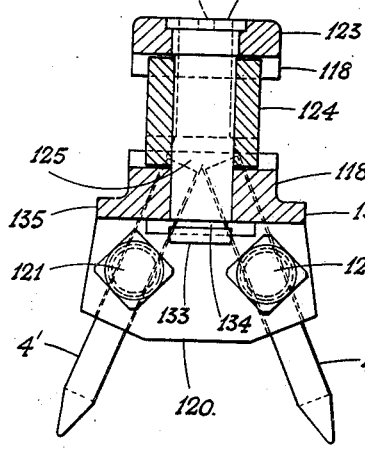
Fig. 8 is a sectional view taken on line VIII—VIII of Fig. 7.

The main body of the machine which is indicated generally by reference numeral 1 is a boxlike structure built up from plates or castings in any suitable manner and has projecting from one side of it an open frame or jib 2, here shown as substantially rectangular, on which the operative portion or cutting run of the endless cutter chain is guided as indicated by the chain dotted line 3 in Fig. 1 and as described more fully hereinafter. A portion of the cutting chain is illustrated in Fig. 3 and the chain details are illustrated in Figs. 6 to 8 described later and here it will be sufficient to note that the cutter chain is provided with cutting picks 4' projecting from the sides of pick boxes 4 and thus projecting at right angles to the plane of the jib 2. The frame or jib 2 forms three sides of a rectangle and in cross-section it is shaped to provide a guide channel 5, appropriately shaped to receive and retain the cutter chain, and a strengthening or stiffening web 6 behind the guide channel 5. The ends of the jib where it is attached to the main body of the machine are provided with bars 7 projecting from the web 6 and fitting into slots or sockets 8 which are provided at both ends of the machine so that the machine is made suitable for cutting in both directions by unfastening the chain and removing the jib and chain and turning the jib over and fitting it into the other end of the machine, as indicated in dotted lines at 2' in Fig. 3, the chain being then refitted and refastened. To facilitate this operation, the jib 2 is secured to the body of the machine by easily withdrawable locking pins 9 which pass through the sides of the slots 8 and through the bars 7. By withdrawing one of the pins 9 from the bottom of the machine and a corresponding pin from the top of the machine the jib can be swung round, on the other pair of pins as pivots, from the position shown into a position in which it lies parallel to the length of the machine and thus parallel to the coal face to facilitate flitting the machine back along the face. The cutter chain must, of course, be disconnected before the jib is swung.

At the outer end of the jib is a removable section 10 of the frame (Fig. 1) which can be removed and replaced by another section of different length to enable the height of the jib to be varied, and the height of the inner end of the jib is made adjustable by having the socket 8 in the head 11 of a hollow rectangular column 12 which is slidable vertically up and down in a rectangular socket 13 integral with the main body of the machine. The column 12 can be raised or lowered by the rotation of an internal operating screw 14 (Fig. 1) engaging with a nut 15 formed at the top of a tubular shield 16 projecting upwardly from the bottom of the machine and forming a housing for the screw 14. The screw 14 is rotatable by a hand wheel 17 integral with the upper end of the screw, the whole arrangement being constructed and operating in a similar manner to a screw lifting jack.

A driving sprocket 18 for the cutter chain is provided at each end of the machine freely rotatable on a shaft 22, and each driving sprocket is provided with dogs 19 (Fig. 3) which can be engaged by co-operating dogs 20 on a member 21 slidable on the shaft 22 but keyed or splined thereon so that when the member 21 is moved by, for example, a forked lever (not shown) towards the sprocket 18 the latter is coupled to its shaft 22. Each shaft 22 is driven through reduction gears 23, 24 from a shaft 25 extending the whole length of the hollow interior of the base 1 of the machine. The shaft 25 has secured on it a gear 26 (Fig. 3) which is driven, through an idler 27, by a gear 28 fast on an intermediate shaft 29 which also has fast on it a large gear 30 driven from a smaller spur gear 31 secured on the end of the shaft 32 of the driving motor 33. The outer end of each shaft 22 can be adapted for coupling to a loading mechanism of any suitable construction and this can be run with the cutter chain or stopped by disengagement of the dog clutch 19, 20. The same driving motor 33 is used for haulage of the machine and the haulage drive is taken off from a bevel gear 34 secured to the end of the intermediate shaft 29 and meshing with a bevel gear 35 on a cross shaft 36 which has secured on it a pinion 37 engaging with a gear 38 on a hollow shaft or sleeve 39 carrying one element 40' of the haulage clutch 40. This clutch may be of the internal expanding type or of the disc type and it will be seen that the mechanism and clutch 40 are so located and arranged that the mechanism is completely enclosed within the hollow body 1 of the machine but the clutch 40, which is the part most likely to need attention, is in a recess 41 separated from the other mechanism by a partition 41a and the recess 41 is closed by a cover plate 42 so that the haulage clutch is therefore easily accessible for adjustment or repair without it being necessary to uncover and dismantle any of the gearing for this purpose. The other element 40" of the haulage clutch is slidable on splines on a shaft 43 extending through the sleeve 39 and having keyed thereon a sliding gear 44 movable along the shaft 43 for selecting the direction of haulage by engagement with one or other of two gears 45 and 45a on two cross-shafts 46 and 46a one below the other (see also Fig. 2). The lower cross shaft 46a is in two independent parts on the same centre line and one part extends from the partition 41a to the support 47 and is constantly driven from the upper cross shaft 46 by gears 48. The other part of the lower cross shaft 46a has on it the gears 49, 50, 51 which can be engaged in turn by the sliding pinions 52, 53, 54 on the upper cross shaft 46 (which is one single shaft extending from the gear 45 to the gear 55) thus forming an ordinary positive drive change speed gear box giving three different forward haulage speeds when cutting. The cutting haulage drive is from the cross shaft 46 through the reduction gearing 55, 56—62 to the haulage chain sprocket 63. The haulage chain (not shown) lies along the coal face and is gripped between the sprocket 63 and an idler sprocket 64 so that the machine is hauled along as the sprocket 63 is rotated. A high flitting speed when the haulage drive is reversed is obtained by moving gear 65 into mesh with gear 66 on the shaft of gear 58 so that the drive is not transmitted through gears 55, 56 and 57 which then run free, and the speed reduction is reduced to give a high flitting speed.

The striking mechanism for shifting the movable gears is not shown in order to avoid confusion but it may be of any well known form suitable to the functions it has to perform.

When the size of the jib frame is adjusted the length of the cutter chain may have to be altered to correspond and for this purpose the links and pick boxes forming the cutter chain are made easily detachable (as described in connection with Figs. 6 to 8) so that some of them can be removed or others inserted to shorten or lengthen the chain. Any minor variation in adjustments of the length of the chain can be taken up by an adjustable idler sprocket or by arranging that the driving sprocket itself is adjustable in guides on the body of the machine so that it can be moved to take up any slack in the cutter chain, without disconnecting it from the driving motor and gearing.

Figure 1:
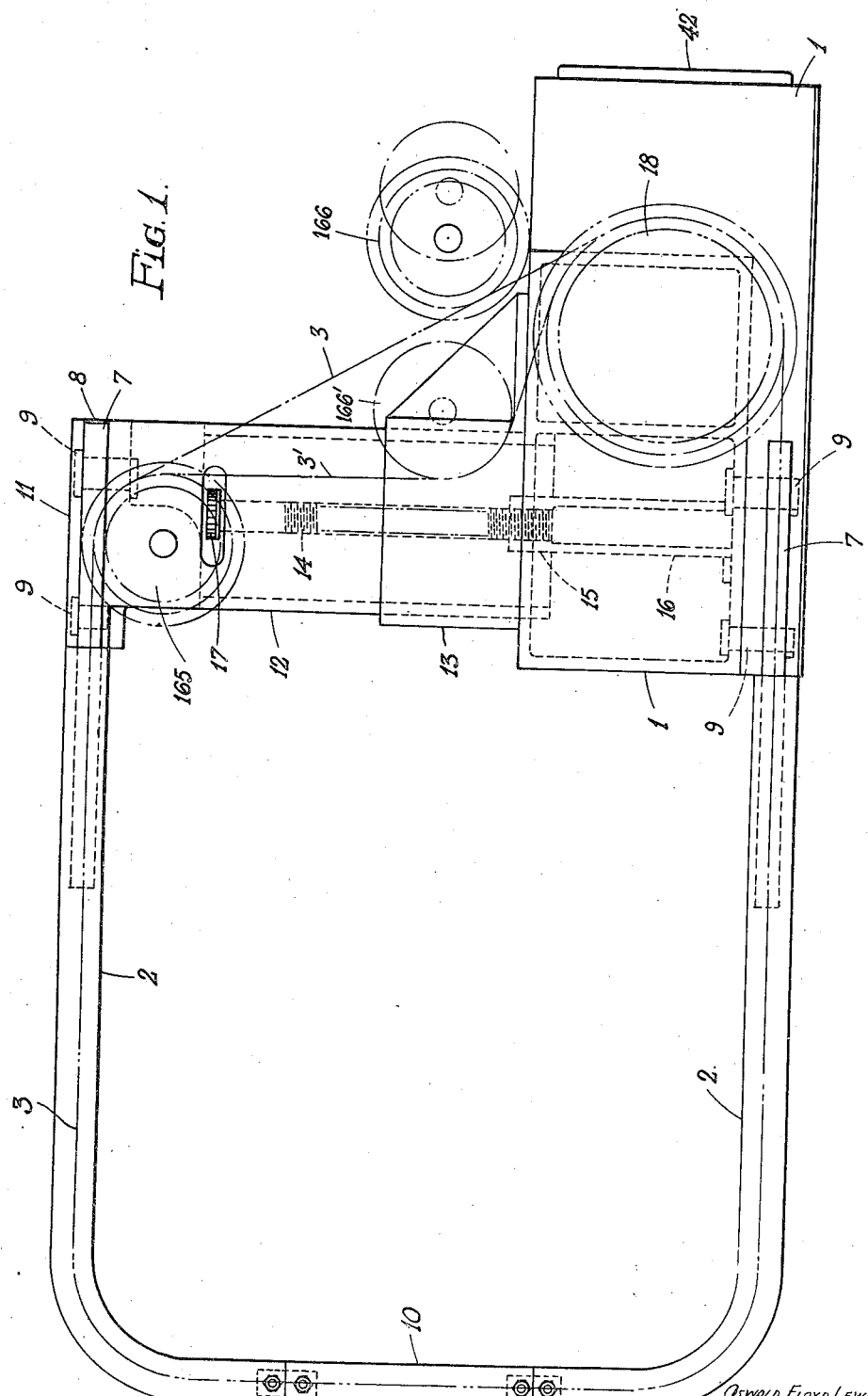
Fig. 1 is an end elevation of the machine with certain of the parts shown diagrammatically.
Figure 2:
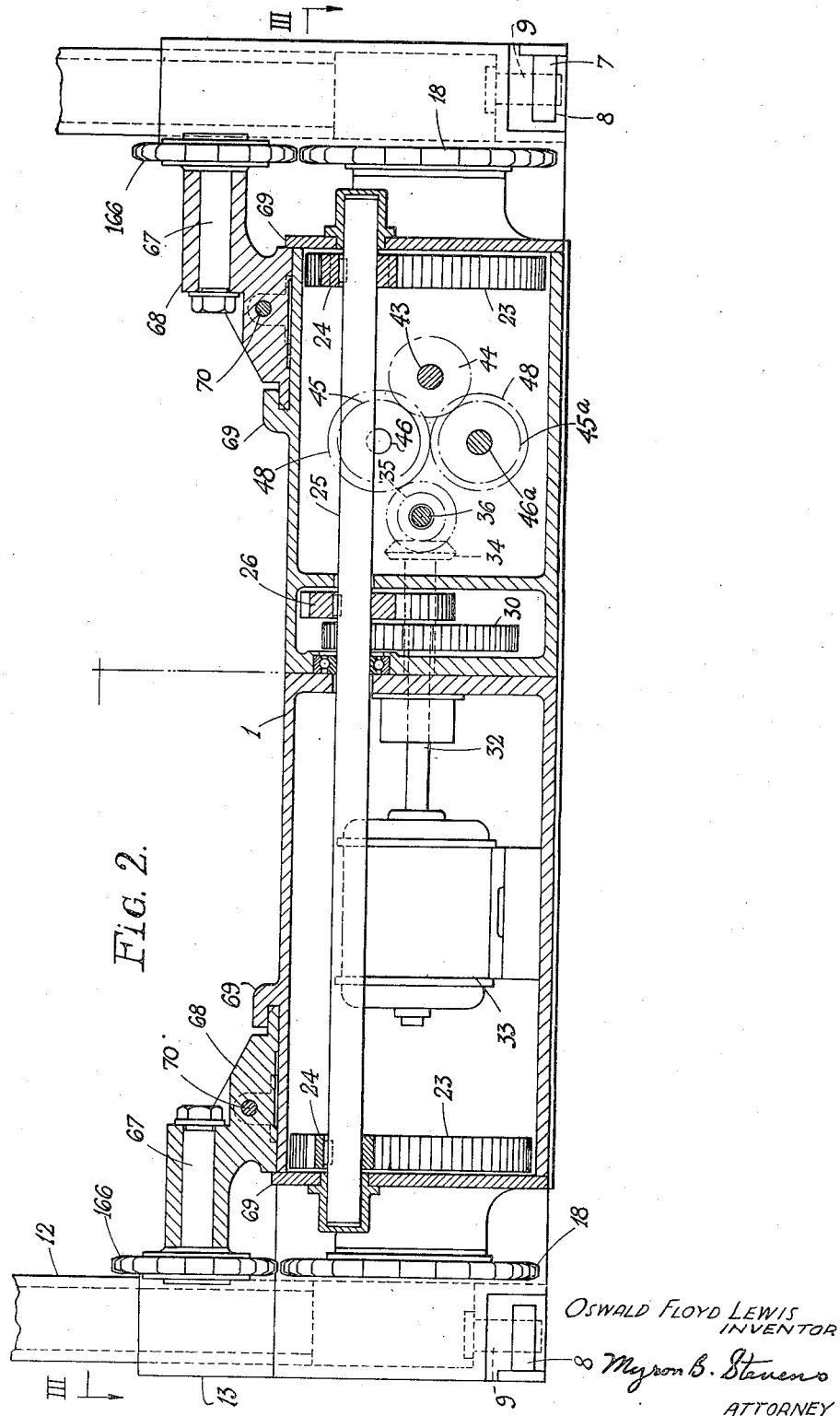
Fig. 2 is a front elevation of the main portion of the machine, partly in section on line II—II of Fig. 3.

The provision of an adjustable idler sprocket is illustrated in Figs. 1, 2 as follows:

The head 11 of the column 12 carries a guide sprocket indicated at 165 (Fig. 1) over which the cutter chain runs, and the chain also passes over the adjustable sprocket 166 which is freely rotatable on a stub shaft 67 (Fig. 2) projecting from a bracket 68 which is slidable in transverse guides 69 projecting from the body 1 of the machine. The position of the bracket is adjusted by rotation of a threaded spindle 70 which passes through a threaded hole or nut 71 in the bracket 68 and is supported at its ends in bearings 72 which allow rotation of the screwed spindle 70 but prevent longitudinal movement thereof. The spindle 70 is rotated by a wrench or key applied to its squared end 73. The adjustable sprocket and associated parts are, of course, duplicated at both ends of the machine, as illustrated in Fig. 2, to cooperate with either of the driving sprockets. If the height of the jib frame is sufficiently low to give a sufficiently large arc of contact of the cutter chain round the driving sprocket, the chain can run practically straight between the guide sprocket 165 and the driving sprocket 18 as indicated at 3 in Fig. 1 in which the sprockets and chain are indicated diagrammatically, and the adjustable sprocket is, in this case, in its outer position as indicated in Fig. 1. On the other hand, if the height of the jib frame is materially increased the arc of contact between the cutter chain and its driving sprocket may become too small for efficient working and the length of the cutter chain can be increased (by inserting additional pick boxes and links) beyond that necessary to allow for the increased height of the jib and the adjustable sprocket moved inwards to a position such as that indicated at 166' so that the chain runs along a path such as 3' to increase its arc of contact round the driving sprocket 18.

Figure 4:
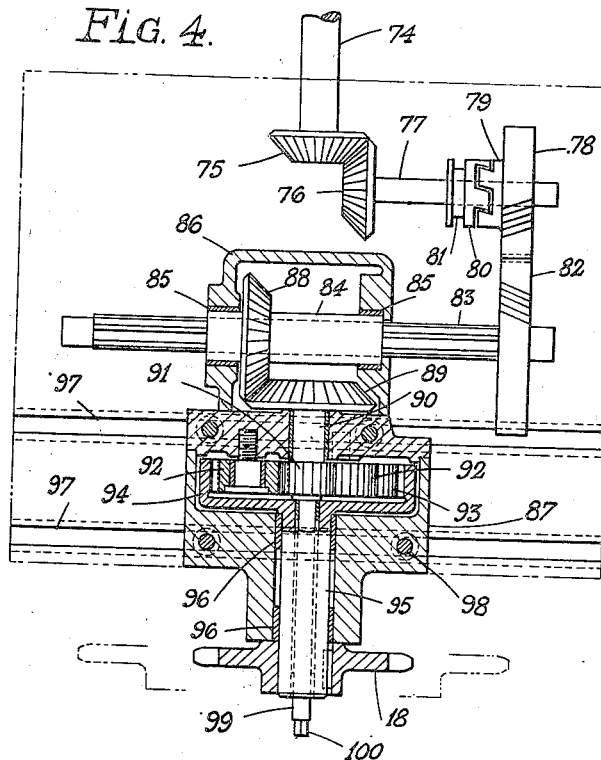
Fig. 4 is a fragmentary sectional view of a modified form of drive for the cutter chain.

As stated above, small variations in the length of the cutting run of the chain can be taken up by moving the driving sprocket and Fig. 4 shows a modified arrangement of the chain drive in which the position of the driving sprocket itself is adjustable. In the construction shown in this Fig. 4 the drive shaft 74 has thereon a bevel gear 75 which meshes with another bevel gear 76 on a shaft 77 carrying a gear 78 freely rotatable on the shaft 77 but capable of being coupled thereto by means of a dog clutch of which one element 79 is integral with the gear 78 while the movable member 80 of the clutch is slidable on the shaft by any suitable means such as a forked lever (not shown) engaging the annular groove 81. The slidable clutch half 80 is coupled to the shaft by a key or splines. The gear 78 meshes with a larger gear 82 secured at one end of an externally splined shaft 83 lying parallel to the plane of the driving sprocket 18. Surrounding the splined shaft 83 is a hollow shaft 84 having internal splines by which the hollow shaft 84 is coupled to the externally splined shaft 83 but is capable of sliding movement thereon. The hollow shaft 84 is supported by bearings 85 in a hollow casing 86 forming part of a sliding head 87 carrying the chain driving sprocket 18.

Mounted on the hollow shaft 84 inside the casing 86 is a bevel gear 88 which meshes with a bevel gear 89 on a short shaft 90 to which is secured a central pinion 91 meshing with three idler pinions 92 surrounding it which in turn mesh with internal teeth 93 on the inner face of a hollow gear 94 integral with the driving sprocket shaft 95 on the outer end of which the driving sprocket 18 is secured. The shaft 95 is supported in the head 87 by bearings 96. Suitable bearings are, of course, provided for the other shafts and gears. The head 87 is slidable, parallel to the spline, in undercut or T-section guides 97 so that the sprocket 18 is movable between the limits indicated and the drive to the sprocket 18 maintained by the splined coupling between the hollow shaft 84 sliding along the shaft 83. The head 87 can be clamped in position by bolts indicated at 98 whose heads fit in the under-cut guides 97. The shaft 95 is hollow and through it passes a spindle 99 integral with gear 91 and having a squared end 100 to which a handle or wrench can be fitted to rotate the sprocket 18 and move the cutter chain by hand if this should be necessary.

Figure 5:
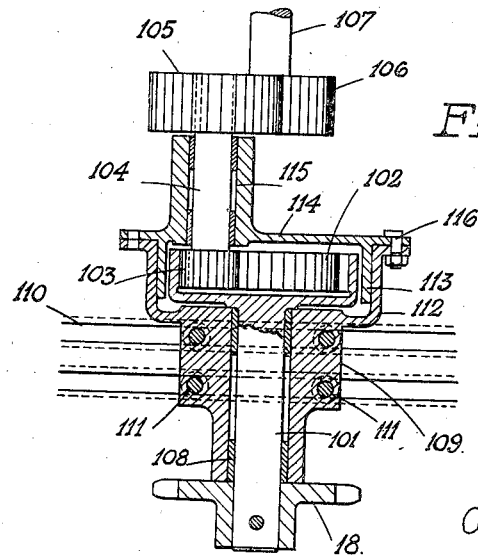
Fig. 5 is a fragmentary sectional view of another modified form of drive for the cutter chain.

Fig. 5 shows an alternative construction of movable driving sprocket and a suitable drive thereto and in this case the cutter chain driving sprocket 18 is fixed on the end of a short shaft 101 which at its other end is formed as an internally toothed ring or gear 102 and meshing with the internally toothed gear 102 is a smaller spur wheel 103 which is thus offset from the centre line of the cutter chain sprocket shaft 101. The spur wheel 103 is fixed on a shaft 104 carrying a gear 105 driven by a gear 106 on a motor shaft 107 in alignment with shaft 101 or by a driving chain from the motor shaft. The cutter-chain sprocket shaft 101 is journalled in bearings 108 in a bracket or head 109 slidable in undercut guides 110 in the body of the machine and capable of being clamped in position by bolts indicated at 111. The bracket 109 is enlarged to form a cylindrical casing 112 surrounding the internally toothed gear 102. Fitting into this cylindrical casing 112 is a cylindrical flange 113 projecting from a cover plate 114 formed into a bearing 115 for the shaft 104. The cover plate 114 is normally clamped to the cylindrical casing 112 by clamps 116 and by slackening the clamps 116 and slackening the holding bolts 111 for the bracket, the latter can be moved to vary the position of the cutter chain sprocket 18 and during this movement the spur wheel 103 moves eccentrically with respect to the cutter chain sprocket shaft 101 around the inside of the internally toothed gear 102 so as to maintain constant the drive from the motor shaft 107.

Referring now to Figs. 6 to 8, the cutter chain is built up of pick boxes 4 and interposed links 117 and one of each of these is shown in Figs. 6 to 8. Each pick box 4 consists of two parallel side members 118, 118' spaced apart, and joined by a body portion 119, and from the outside face of one side member 118' projects a pick block 120 into which are fitted cutting picks 4' secured by clamping bolts 121. The pick boxes forming the cutter chain are positioned so that all the cutting picks project from the same side of the chain, which is that side projecting from the jib 2 (Fig. 3). Each pick box is constructed in two parts welded together at the body portion 119 as indicated at 122 in Fig. 7.

The side members 118, 118' of each pick box are extended to form projecting ears 123 between which fit the end bosses 124 of the connecting links 117 and the boxes and links are pivoted together by pivot pins 125 passing through holes or sockets 126 in the ears 123 and through holes 127 in the end bosses of the links. Each link 117 is provided with a central hole or socket 128 shaped to receive a tooth of the chain driving sprocket or of any idler sprocket as the chain is driven round. The body 119 of each pick box 4 is arcuately recessed out at its ends as indicated at 129 to provide clearances for the end bosses of the links.

The enlarged end 130 of each pivot pin 125 is made to fit flush with the outer face of the side member 118 which rides on the bottom of the chain guide groove 5 in the jib 2 (Fig. 3) and the end 130 of the pin has a projecting shoulder 131 fitting into a recess 132 in the face of member 118. The other end 133 of the pin projects from the pick box and has an annular groove 134 to receive a ring (not shown) for securing the pin in place. This arrangement enables any of the pins 125 to be easily and quickly removed when varying the length of the cutter chain. The end bosses 124 of each link 117 are of smaller radius than the projecting ears 123 of the pick boxes between which they fit so as to provide retaining and guiding shoulders between ears 123 to assist in holding the cutter chain in its guide during its travel round the jib.

The outer face of the side member 118' of each pick box is extended as shown clearly at 135 in Figs. 6 and 8 to form a kind of cover over the opening of the guide slot 5 in the jib (Fig. 3) when the chain is in place therein and to ride on the face of the jib, and the corresponding side of each link is similarly extended as indicated at 136 in Figs. 6 and 7, the height of the body of the link being indicated by the dotted lines 137 in Fig. 6 while the guide recess between the sides of the body is indicated at 138.

The coal cutter is preferably combined with a loading arrangement consisting of small conveyors following along and behind the jib. The coal falls on these conveyors and is deposited on to the usual long wall coal conveyor. In case of poor roof conditions the coal should be deposited from the loader on to a conveyor placed along the new face, that is right behind the chain in the space where the coal is being cut and loaded. With this location of the main conveyor it is necessary of course to add sections to the conveyor to increase its length as the coal is being mined.

The machine according to the invention has the important advantage that the area of unsupported roof is reduced to a minimum. This is extremely important, particularly with bad roof conditions. The machine also has the other advantages that shot firing is eliminated; the part of the chain which runs in the open space made by the previous cutting operations is easily accessible for changing the picks; while the chain working in a vertical plane naturally has the force of gravity helping to counteract any tendency of the cuttings being carried back into the cut. This latter advantage is a very considerable one as the power required to drive a cutting chain when clogged with cutting is often two or three times that required to drive a chain running clear of cuttings. To assist in the prevention of clogging, the portion of the chain around the sprocket and between the sprocket and floor and roof can be encased to limit the dust nuisance, and the action of the chain brings the cuttings sufficiently high to be deposited on to a small conveyor which would deliver all cuttings on to the main conveyor.

What I claim as my invention and desire to secure by Letters Patent is:

1. In an endless chain coal-cutting and like machine, a body containing a motor and gearing for driving the cutter chain, a rectangular jib frame projecting from the body, a replaceable section in the side of the jib frame remote from the body, an adjustable structure supporting the jib frame on the body, a chain driving sprocket adjacent said adjustable structure and driven by said motor and gearing, an endless cutter chain guided on said jib frame and engaging and driven by said sprocket, an adjustable guide sprocket adjacent said driving sprocket and engaging the chain, a bracket carrying said adjustable sprocket, and means for moving said bracket and adjustable sprocket in a direction parallel to the plane of said driving sprocket.

2. In a chain coal-cutting and like machine, a hollow body divided by partition walls into separate compartments, a driving motor in one of said compartments, a driven shaft for the cutter chain drive extending through said compartments, gearing in another of said comparments for driving the shaft from the motor, change speed gears in said other compartment and driven from the aforesaid gearing, a haulage sprocket driven from the motor through said change speed gears, and a clutch controlling the drive to the haulage sprocket and located in a separate compartment at the side of the machine body.

3. A machine for cutting coal or the like, comprising a body, endless coal cutting means, means in said body for moving said machine in at least one direction and for driving said cutting means, an open jib frame projecting laterally from said body at substantially right angles thereto and to said direction of movement, said jib providing guide means for said cutting means, a portion of said jib frame being removable to provide spaced jib frame end portions, an opposite portion of said jib frame comprising telescopically connected portions movable relative to each other to permit said jib frame to be reduced in size in a direction to bring said spaced end portions into engagement with each other, whereby to reduce the size of said frame in one direction.

4. The structure of claim 3, said frame comprising top, bottom and side portions, said removable portion being located in a side portion, and said telescopic portions being located in said opposite side portion and being carried by said body.

5. In a machine for cutting coal or the like from a vein having an open side and end, including a body, an open jib frame projecting laterally from said body, endless cutting means carried by said frame adjacent the periphery thereof, and means in said body for driving said cutting means and for advancing said body along said side of said vein with said cutting means engaging said end of said vein to cut a substantially U-shaped cut thereinto; means on said frame for varying at least the height thereof to conform to the thickness of said vein said height varying means comprising a telescopic connection between two of said frame members.

6. In an endless chain coal cutting or like machine, a drive sprocket for the chain thereof, a spindle mounting said sprocket, a supporting head mounting said spindle, a drive shaft, means operatively connecting said shaft to said spindle, means for varying the tenseness of said chain, comprising means mounting said head, spindle and sprocket for sliding movement transversely of said shaft, and means for maintaining said operative connection between said shaft and spindle during the sliding of said head.

7. The structure of claim 5, said drive means for said cutting means including a drive wheel engaging said cutting means, a spindle mounting said wheel, a supporting head mounting said spindle, and a drive shaft fixed on said body and having an operative connection with said spindle, means mounting said head on said body for sliding movement transversely of said shaft, and means for maintaining said operative connection between said shaft and spindle during the sliding of said head.

OSWALD FLOYD LEWIS.